US010993175B1

(12) United States Patent
Oh et al.

(10) Patent No.: US 10,993,175 B1
(45) Date of Patent: Apr. 27, 2021

(54) SPECTRUM INFORMATION QUERY SYSTEM AND A SECURED QUERY PROXY DEVICE

(71) Applicant: Whizpace Pte Ltd, Singapore (SG)

(72) Inventors: Ser Wah Oh, Singapore (SG); Pankaj Sharma, Singapore (SG)

(73) Assignee: Whizpace Pte Ltd, Singapore (SG)

( * ) Notice: Subject to any disclaimer, the term of this patent is extended or adjusted under 35 U.S.C. 154(b) by 183 days.

(21) Appl. No.: 16/464,572

(22) PCT Filed: Nov. 27, 2017

(86) PCT No.: PCT/SG2017/050583
§ 371 (c)(1),
(2) Date: May 28, 2019

(87) PCT Pub. No.: WO2018/101884
PCT Pub. Date: Jun. 7, 2018

(30) Foreign Application Priority Data

Nov. 29, 2016 (SG) .......................... 10201610015W

(51) Int. Cl.
*H04W 4/00* (2018.01)
*H04W 48/14* (2009.01)
(Continued)

(52) U.S. Cl.
CPC ......... *H04W 48/14* (2013.01); *H04L 63/0281* (2013.01); *H04L 63/0428* (2013.01); *H04W 16/14* (2013.01); *H04W 48/12* (2013.01)

(58) Field of Classification Search
CPC ..... H04W 48/14; H04W 16/14; H04W 48/12; H04L 63/0428; H04L 63/0281
See application file for complete search history.

(56) References Cited

U.S. PATENT DOCUMENTS

2012/0281593 A1* 11/2012 Stewart ............. H04W 36/0079
370/259

FOREIGN PATENT DOCUMENTS

| CN | 105163318 A | 12/2015 |
|---|---|---|
| WO | 2012/097343 A1 | 7/2012 |
| WO | 2016/171621 A1 | 10/2016 |

OTHER PUBLICATIONS

Park, et al. "Ensuring Operational Privacy of Primary Users in geolocation Database-Driven spectrum Sharing", Summary Report for Task 1: Prior-Art Privacy Preserving Databases and Threat Models, Jun. 30, 2013, 63 pages, Retrieved on May 20, 2019 from https://www.ntia.doc.gov/files/ntia/publications/ssd-summary_report-trl_1_link_5.pdf.

(Continued)

*Primary Examiner* — Amancio Gonzalez
(74) *Attorney, Agent, or Firm* — Kilpatrick Townsend & Stockton LLP

(57) ABSTRACT

A spectrum information query system, a method of querying a database storing spectrum information and a secured query proxy device are provided, the spectrum information query system comprising a database storing spectrum information; one or more spectrum utilising devices forming a first communications network; and a secured query proxy device, the secured query proxy device configured to communicate at its front-end with the database storing spectrum information, wherein the secured query proxy device is configured at its back-end for a one-way downlink to the first communications network; a decoupled source that is decoupled from the first communications network, the source being coupled to the secured query proxy device, wherein the secured query proxy device is configured to obtain information associated with the first communications network via the decoupled source, the secured query proxy device being further configured to perform encryption of obtained infor- (Continued)

mation associated with the first communications network obtained from the decoupled source; and wherein the secured query proxy device is further configured to apply one or more security data preservation measures to the received spectrum information prior to transmission of the received spectrum information to the first communications network via the one-way downlink.

30 Claims, 8 Drawing Sheets

(51) Int. Cl.
*H04W 48/12* (2009.01)
*H04L 29/06* (2006.01)
*H04W 16/14* (2009.01)

(56) References Cited

OTHER PUBLICATIONS

PCT/SG2017/050583 received an International Search Report and Written Opinion dated Mar. 1, 2018, 9 pages.
PCT/SG2017/050583 received an International Preliminary Report on Patentability completed Oct. 15, 2018, 4 pages.

\* cited by examiner

SPECTRUM INFORMATION QUERY SYSTEM AND A SECURED QUERY PROXY DEVICE

TECHNICAL FIELD

The present disclosure relates broadly to a spectrum information query system, a method of querying a database storing spectrum information and a secured query proxy device.

BACKGROUND

Traditionally, spectrum is allocated in a fixed or semi-fixed manner where specific frequency bands are allocated to license owners. Since the license owners may not fully utilise the respective allocated spectrum at all times and at all places, there is under-utilisation of spectrum. To improve spectrum utilisation rates, dynamic ways of using spectrum such as Dynamic Spectrum Access (DSA) have been explored to utilise spectrum in a dynamic and/or opportunistic manner. Television White Spaces (TVWS) is a DSA system that attempts to use spectrum dynamically in TV bands. One of the promising ways of accessing underutilised spectrum dynamically is via a look-up to a Geo-Location Database (GLDB).

Accessing a GLDB is part of a querying system where a DSA or TVWS device accesses a database to obtain information on the available channels (or spectrum) at the location of the device for specific duration(s). The device can then select one or more of the available channels for communications.

It has been recognised that a query network that queries a GLDB typically conducts queries in a bi-directional format and over a communications network. For example, a query engine of the querying network device typically sends the device location and other parameters, and receives a list of available channels for communications and other parameters. It has been recognised that this setup has a potential avenue for unauthorised access to the querying network via the device that conducts the querying of the GLDB.

To address the above issue, network firewalls are typically deployed at a querying network to filter traffic and additionally, mutual authentication may be used to further enhance the security levels. Alternatively, network monitoring or installation of anti-malware solutions are used. However, it has been recognised by the inventors that these measures are deployed by software which potentially have loopholes for attacks and manipulation. In addition, the costs to deploy the software network components are relatively expensive. Further, it has been recognised by the inventors that such current software solutions are not able to detect data tampering and protect data privacy.

In view of the above, there exists a need for a spectrum information query system, a method of querying a database storing spectrum information and a secured query proxy device that seek to address at least one of the above problems.

SUMMARY

In accordance with an aspect of the present disclosure, there is provided a spectrum information query system, the system comprising a database storing spectrum information; one or more spectrum utilising devices forming a first communications network; and a secured query proxy device, the secured query proxy device configured to communicate at its front-end with the database storing spectrum information, wherein the secured query proxy device is configured at its back-end for a one-way downlink to the first communications network; a decoupled source that is decoupled from the first communications network, the source being coupled to the secured query proxy device, wherein the secured query proxy device is configured to obtain information associated with the first communications network via the decoupled source, the secured query proxy device being further configured to perform encryption of obtained information associated with the first communications network obtained from the decoupled source; and wherein the secured query proxy device is further configured to apply one or more data preservation measures to the received spectrum information prior to transmission of the received spectrum information to the first communications network via the one-way downlink.

The system may further comprise the secured query proxy device being configured to query the database storing spectrum information using the information associated with the first communications network obtained from the decoupled source that is decoupled from the first communications network.

The secured query proxy device may be configured to encode the received spectrum information as one of the one or more data preservation measures.

The secured query proxy device may be configured to encrypt the received spectrum information as one of the one or more data preservation measures.

The secured query proxy device may be configured to schedule a periodic transmission of the received spectrum information to the first communications network via the one-way downlink as one of the one or more data preservation measures.

The secured query proxy device may comprise a user interface module to facilitate the decoupled source that is decoupled from the first communications network.

The secured query proxy device may be configured to access another database that functions as a decoupled source that is decoupled from the first communications network, the another database storing the information associated with the first communications network.

The system may further comprise another secured query proxy device to function as the decoupled source that is decoupled from the first communications network and as a proxy between the secured query proxy device and the first communication network, the another secured query proxy device comprising at least one one-way communication link.

At least one of the one or more spectrum utilising devices may be configured to perform a reversal of the one or more data preservation measures to recover the received spectrum information.

The database storing spectrum information may comprise a Geo-Location Database (GLDB) and the information associated with the first communications network may comprise geographical location information of the one or more spectrum utilising devices.

The secured query proxy device may be further configured to process received spectrum information received from the database storing spectrum information into non-executable information prior to application of the one or more data preservation measures.

In accordance with another aspect of the present disclosure, there is provided a method of querying a database storing spectrum information, the method comprising providing a database storing spectrum information; providing one or more spectrum utilising devices forming a first communications network; and providing a secured query proxy device functioning as a proxy device between the first communications network and the database storing spectrum information; providing a decoupled source that is decoupled from the first communications network, the source being coupled to the secured query proxy device; obtaining information associated with the first communications network at the secured query proxy device via the decoupled source; encrypting at the secured query proxy device the obtained information associated with the first communications network obtained from the decoupled source; using the secured query proxy device to communicate at its front-end with the database storing spectrum information; using the secured query proxy device at its back-end for a one-way downlink to the first communications network; and applying one or more data preservation measures at the secured query proxy device to the received spectrum information prior to transmission of the received spectrum information to the first communications network via the one-way downlink.

The method may further comprise querying the database storing spectrum information using the secured query proxy device that is in turn using the information associated with the first communications network obtained from the decoupled source that is decoupled from the first communications network.

The method may further comprise encoding the received spectrum information as one of the one or more data preservation measures.

The method may further comprise encrypting the received spectrum information as one of the one or more data preservation measures.

The method may further comprise scheduling a periodic transmission of the received spectrum information by the secured query proxy device to the first communications network via the one-way downlink as one of the one or more data preservation measures.

The method may further comprise providing a user interface module at the secured query proxy device to facilitate the decoupled source that is decoupled from the first communications network.

The method may further comprise accessing another database that functions as a decoupled source that is decoupled from the first communications network, the another database storing the information associated with the first communications network.

The method may further comprise providing another secured query proxy device functioning as the decoupled source that is decoupled from the first communications network and as another proxy device between the first communications network and the secured query proxy device; the another secured query proxy device comprising at least one one-way communication link.

The method may further comprise performing a reversal of the one or more data preservation measures to recover the received spectrum information at at least one of the one or more spectrum utilising devices.

The database storing spectrum information may comprise a Geo-Location Database (GLDB) and the information associated with the first communications network may comprise geographical location information of the one or more spectrum utilising devices.

The method may further comprise processing at the secured query proxy device received spectrum information received from the database storing spectrum information into non-executable information prior to application of the one or more data preservation measures.

In accordance with yet another aspect of the present disclosure, there is provided a secured query proxy device, the device comprising a front-end communications module, the front-end communications module configured for multi-directional communications; a back-end communications module, the back-end communications module configured for a one-way communication; an input module, the input module configured to couple to a decoupled source that is decoupled from a communications network; an encryption module, the encryption module configured to encrypt information associated with the communications network; one or more information-processing modules, the one or more information-processing modules being configured to apply one or more data preservation measures to the received information prior to transmission of the received information via the back-end communications module for the one-way communication.

The device may further comprise the front-end communications module being configured to query a database storing spectrum information using information associated with the communications network obtained from the decoupled source that is decoupled from the communications network.

The device may further comprise the one or more information-processing modules being configured to encode the received information as one of the one or more data preservation measures.

The device may further comprise the one or more information-processing modules being configured to encrypt the received information as one of the one or more data preservation measures.

The back-end communications module may be configured to schedule a periodic transmission of the received information as one of the one or more data preservation measures.

The input module may comprise a user interface module to facilitate the decoupled source that is decoupled from the communications network.

The input module may be configured to access another database that functions as a decoupled source that is decoupled from the communications network, the another database storing the information associated with the communications network.

The one or more information-processing modules may be further configured to process received spectrum information received from the database storing spectrum information into non-executable information prior to application of the one or more data preservation measures.

BRIEF DESCRIPTION OF THE DRAWINGS

Exemplary embodiments of the present disclosure will be better understood and readily apparent to one of ordinary skill in the art from the following written description, by way of example only, and in conjunction with the drawings, in which.

DETAILED DESCRIPTION

Exemplary embodiments described below may provide a spectrum information query system, a method of querying a database storing spectrum information and a secured query proxy device.

In an exemplary embodiment, the spectrum information query system comprises a database storing spectrum information, one or more spectrum utilising devices forming a first communications network, and a secured query proxy device configured to communicate at its front-end with the database storing spectrum information via a second communications network. In the exemplary embodiment, the secured query proxy device is configured at its back-end to comprise a one-way downlink to the first communications network. Further, the secured query proxy device is configured to obtain information associated with the first communications network via a source that is decoupled from the first communications network. The secured query proxy device is also configured to perform encryption of obtained information associated with the first communications network obtained via the decoupled source. Further, in the exemplary embodiment, the secured query proxy device is configured to apply one or more data preservation measures, prior to transmitting the processed spectrum information to the first communications network via the one-way downlink.

In exemplary embodiments, the one or more data preservation measures may include one or more measures to protect or ensure data integrity, e.g. encoding of received spectrum information and/or scheduling periodic re-transmission of received spectrum information. The one or more data preservation measures may also include one or more security measures, e.g. encryption of received spectrum information.

In exemplary embodiments, the secured query proxy device may additionally be configured to receive spectrum information from the database and process the received spectrum information e.g. into non-executable information and/or plain-text information prior to application of the one or more data preservation methods.

In the exemplary embodiments herein, the term "decoupled source" from a communications network is understood to mean that a source is not directly linked to the communications network, or more particularly, traffic cannot be transmitted through the source to reach the communications network.

In some exemplary embodiments, a method, system and device for secured spectrum access using a Geo-Location Database (GLDB) may be provided. In these exemplary embodiments, the method, system and device may isolate one or more DSA or TVWS networks from the link that accesses the GLDB. In these exemplary embodiments, the method, system and device may use unidirectional traffic through hardware isolation to eliminate any potential attacks or hacking that are performed via software.

Detailed examples of various exemplary, non-limiting embodiments are described below.

Figure 1:
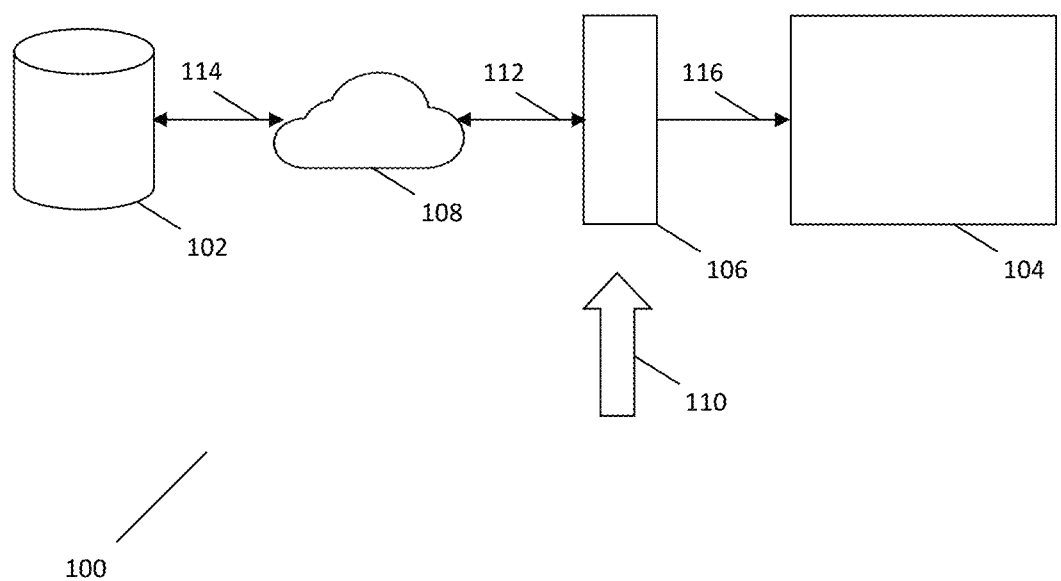
FIG. 1 is a schematic diagram illustrating a spectrum information query system in an exemplary embodiment.

FIG. 1 is a schematic diagram illustrating a spectrum information query system 100 in an exemplary embodiment. The spectrum information query system 100 comprises a database 102 storing spectrum information. The spectrum information query system 100 comprises one or more spectrum utilising devices forming a first communications network 104 and a secured query proxy device 106.

In the exemplary embodiment, the database 102 is in the form of, but is not limited to, a computer server and comprises a processing module (not shown). The database 102 stores spectrum information that may be utilised by spectrum utilising devices such as communications devices, televisions, wireless microphones etc.

In the exemplary embodiment, the secured query proxy device 106 is configured to communicate at its front-end with the database 102 storing spectrum information. The communication may be via a second communications network 108 such as, but not limited to, a communications network or the internet etc. That is, the secured query proxy device 106 may transmit and receive information to and from the database 102. See numerals 112 and 114.

In the exemplary embodiment, the secured query proxy device 106 is configured at its back-end to comprise or for a one-way downlink to the first communications network 104. Thus, the secured query proxy device 106 may only transmit information to the first communications network 104. See numeral 116.

In the exemplary embodiment, the secured query proxy device 106 is configured to obtain information associated with the first communications network 104 via a source 110 that is decoupled from the first communications network.

In the exemplary embodiment, the secured query proxy device 106 is configured to perform encryption on information associated with the first communications network 104 obtained via the source 110, e.g. prior to storage of the information within the secured query proxy device 106. For example, the information obtained via the source 110 is encrypted and subsequently, the encrypted information is stored at a memory module (not shown) within the secured query proxy device 106.

Further, in the exemplary embodiment, the secured query proxy device 106 is configured to apply one or more data preservation measures to the received spectrum information, prior to transmitting the received spectrum information to the first communications network 104 via the one-way downlink.

In exemplary embodiments, the one or more data preservation measures may include one or more measures to protect or ensure data integrity, e.g. encoding of received spectrum information and/or scheduling periodic re-transmission of received spectrum information. The one or more data preservation measures may also include one or more security measures, e.g. encryption of received spectrum information.

In the exemplary embodiment, the secured query proxy device 106 may be further configured to pre-process or process received spectrum information e.g. into non-executable information and/or plain-text information such that the information is not able to effect programming changes or operations of the devices of the first communications network 104, i.e. for the prevention of attacks or hacking. The processing may be performed prior to application of the one or more data preservation methods.

In the exemplary embodiment, the secured query proxy device 106 is further configured to query the database 102 using the information associated with the first communications network 104 to obtain spectrum information.

In the exemplary embodiment, at least one of the one or more spectrum utilising devices is configured to perform a reversal of the one or more data preservation measures to recover the received spectrum information.

Figure 2A:
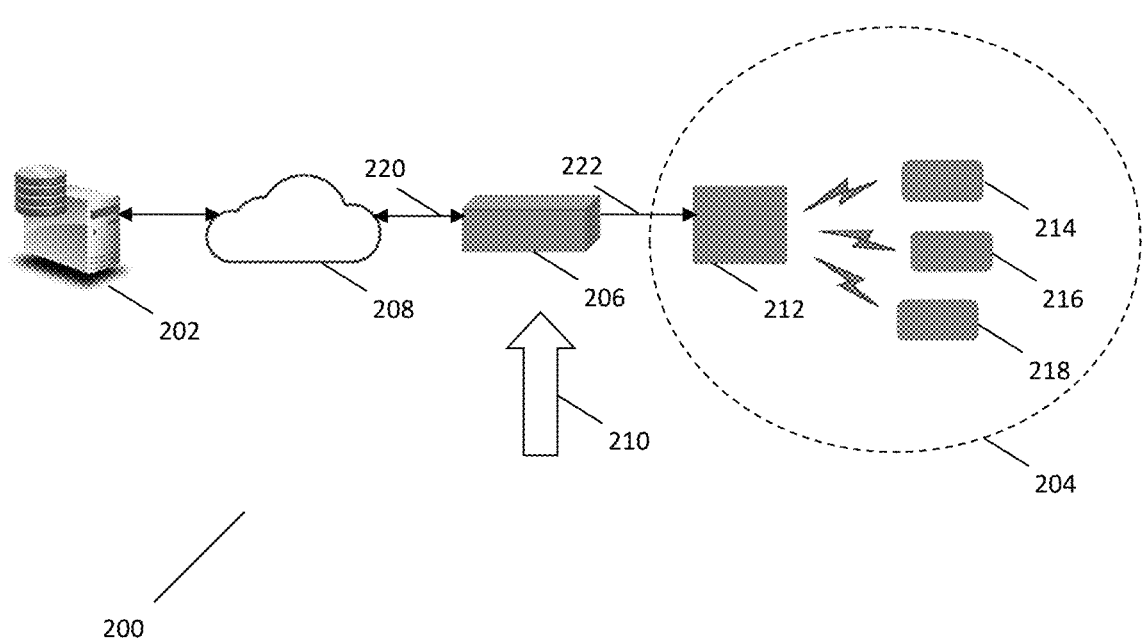
FIG. 2A is a schematic diagram illustrating a spectrum information query system in an exemplary embodiment.

FIG. 2A is a schematic diagram illustrating a spectrum information query system 200 in an exemplary embodiment. The spectrum information query system 200 functions substantially similarly to the spectrum information query system 100 described with reference to FIG. 1.

In the exemplary embodiment, the spectrum information query system 200 comprises a database 202 storing spectrum information implemented as a Geo-Location Database (GLDB) 202. The spectrum information query system 200 also comprises one or more TVWS devices e.g. 212, 214, 216, 218 forming a TVWS network 204, and a secured query proxy device 206 termed as a Secured Database Access System (SecDAS) 206. The TVWS network 204 comprises a TVWS Master Device 212 that is in turn coupled and is able to communicate, using wired connections, wireless connections or both, with other TVWS devices 214, 216, 218.

The SecDAS 206 is disposed in the spectrum information query system 200 between the TVWS network 204 and the GLDB 202.

In the exemplary embodiment, the SecDAS 206 is configured to communicate at its front-end with the database 202 via a second communications network 208. In the exemplary embodiment, the second communications network 208 comprises the internet. For example, the SecDAS 206 may query the GLDB 202 for spectrum information based on information, e.g. comprising geographical location, associated with the one or more TVWS devices e.g. 212, 214, 216, 218 forming the TVWS network 204 via the second communications network 208. The SecDAS 206 may receive spectrum information based on the query from the GLDB 202. Thus, the SecDAS 206 is configured for multi-directional communications, e.g. transmit and receive information/data. See numeral 220. Thus, data may be sent and received using e.g. typical internet protocols such as https etc. In the exemplary embodiment, the SecDAS 206 is further configured at its back-end for a one-way downlink to the TVWS network 204. The SecDAS 206 may only transmit information to the TVWS network 204. See numeral 222.

In the exemplary embodiment, the SecDAS 206 is configured to obtain information associated with the TVWS network 204 via a decoupled source 210 that is decoupled from the TVWS network 204. In the exemplary embodiment, the information associated with the TVWS network 204 comprises geographical location of each device and other parameters related to the one or more TVWS devices e.g. 212, 214, 216, 218.

In the exemplary embodiment, the SecDAS 206 is configured to perform encryption on the information associated with the TVWS network 204 obtained via the decoupled source 210, e.g. prior to storage of the information within the SecDAS 206. For example, the information obtained via the decoupled source 210 is encrypted and subsequently, the encrypted information is stored in a memory module within the SecDAS 206.

In addition, the SecDAS 206 is configured to apply one or more data preservation measures, e.g. encoding non-executable information, prior to transmitting the processed spectrum information to the TVWS network 204 via the one-way downlink 222.

In exemplary embodiments, the one or more data preservation measures may include one or more measures to protect or ensure data integrity, e.g. encoding of received spectrum information and/or scheduling periodic re-transmission of received spectrum information. The one or more data preservation measures may also include one or more security measures, e.g. encryption of received spectrum information.

In the exemplary embodiment, the SecDAS 206 may additionally be configured to pre-process received spectrum information, i.e. spectrum information received from the GLDB 202 as a result of the query. The received spectrum information may be processed by the SecDAS 206 e.g. into non-command, non-executable information and/or plain-text information. That is, the spectrum information is processed so that the processed information is not able to effect programming changes or operations of the one or more TVWS devices e.g. 212, 214, 216, 218 of the TVWS network 204, i.e. for the prevention of attacks or hacking. The processing may be performed prior to application of the one or more data preservation methods.

During use, the SecDAS 206 obtains information associated with the TVWS network 204 via the source 210 that is decoupled from the TVWS network 204. In the exemplary embodiment, the source 210 may be facilitated using or coupled to e.g. a user interface module coupled to the SecDAS 206. The decoupled source 210 may be, but not limited to, a graphical user interface (GUI) module, for a user to input e.g. geographical location information of the one or more TVWS devices e.g. 212, 214, 216, 218. The SecDAS 206 encrypts the information obtained via the source 210 e.g. prior to storage in the SecDAS 206. The encrypted information is obtained from the decoupled source 210 and is decrypted within the SecDAS 206 prior to transmitting the decrypted information to the GLDB 202. The SecDAS 206 transmits, as a query, the decrypted information comprising the locations of the devices and other parameters to the GLDB 202. Such parameters may exemplarily include device identifiers or IDs of devices, type of devices, elevation height of devices etc. In the exemplary embodiment, the GLDB 202 performs the query of the database storing spectrum information using the information and in return, the GLDB 202 transmits the results of the query to the SecDAS 206. The results of the query, or the query results, may comprise a list of available channels for communications and other parameters. Such parameters may exemplarily include validity time of the channels for communication, allowed power level for transmission etc. The transmission and receipt of information at the SecDAS 206 is shown at numeral 220.

In the use, the SecDAS 206 applies one or more data preservation measures. The one or more data preservation measures may include one or more measures to protect or ensure data integrity, e.g. encoding of received spectrum information and/or scheduling periodic re-transmission of received spectrum information. The one or more data preservation measures may also include one or more security measures, e.g. encryption of received spectrum information. The SecDAS 206 then proceeds to transmit the secured spectrum information to the TVWS network 204 via the one-way downlink 222.

The SecDAS 206 may additionally pre-process, or process, prior to further transmission, the received query results or received spectrum information as a result of the query. The SecDAS 206 may process the received spectrum information into non-command, non-executable information and/or plain-text information prior to application of the one or more data preservation methods.

At the TVWS device 212, a reversal of the one or more data preservation measures is performed. The received spectrum information is decoded. The list of available channels is then obtained and further transmitted to other devices e.g. 214, 216, 218 so that suitable frequency channels may be selected for communications.

In an alternative scenario whereby there is an instance of first device power up or re-power up, the TVWS device 212 selects one of the available channels and broadcasts its information. Other devices e.g. 214, 216, 218 may scan through a list of possible frequencies and discover the TVWS device 212. This scanning is prior to the other devices 214, 216, 218 selecting a frequency or channel for transmission. Subsequently, the TVWS device 212 broadcasts the available channels to the other devices 214, 216, 218 for these devices to receive/transmit information.

Figure 2B:
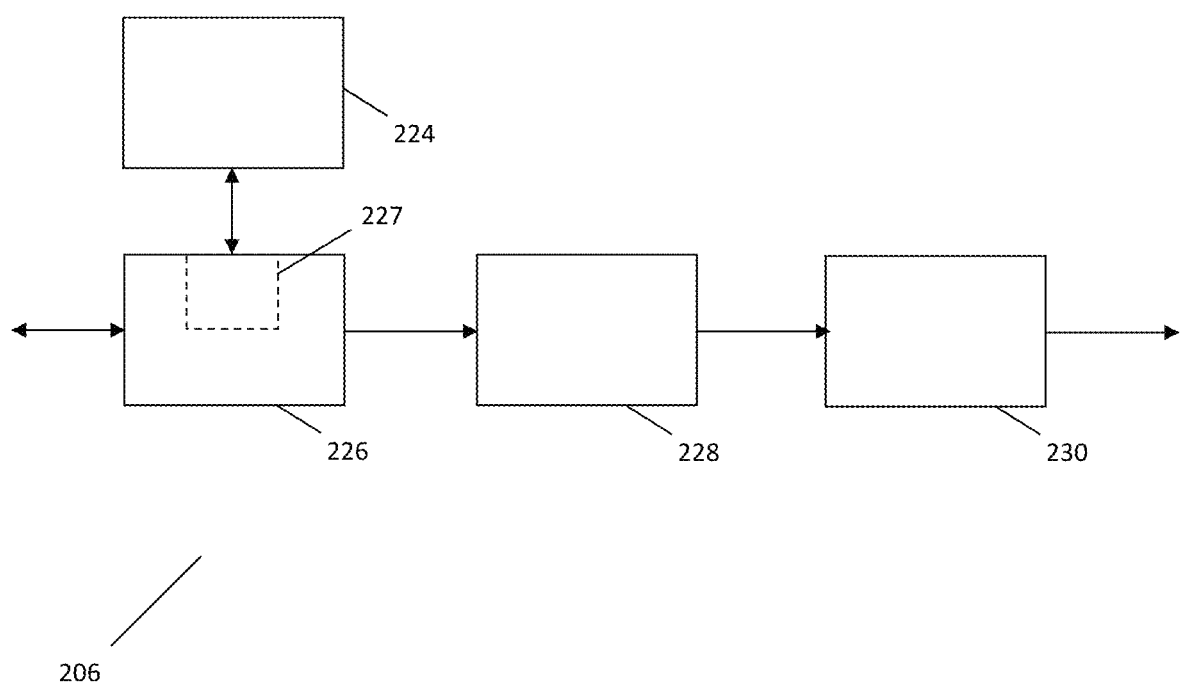
FIG. 2B is a schematic diagram illustrating components of a secured query proxy device of FIG. 2A.

FIG. 2B is a schematic diagram illustrating components of the SecDAS 206.

In the exemplary embodiment, the SecDAS 206 comprises a user interface module 224 coupled to a database query engine module 226. The database query engine module 226 comprises an encryption module 227. The database query engine module 226 is configured to perform encryption of information received from the user interface module 224 using the encryption module 227. The encryption module 227 is also capable of performing decryption of encrypted information. The database query engine module 226 is coupled to an encoding module 228. Further, the encoding module 228 is coupled to a one-way hardware link module 230. The components of the SecDAS 206 are coupled to a processing module (not shown) that is configured to control the functions of the various components. The description of "hardware" for the one-way hardware link in the exemplary embodiments herein indicates that the security is based on hardware implementations, as opposed to merely software commands/algorithms. It is recognised by the inventors that, by mechanically or physically limiting transmission to the one-way downlink using hardware, it may become impossible for attacks on the SecDAS to be carried out remotely. It is recognised by the inventors that attacks on software implementations may be carried out via manipulating software commands, in which even firewalls may be compromised.

In the exemplary embodiment, the encoding module 228 is configured to perform encoding operations as a data preservation measure. The encoding module 228 may also optionally perform encryption operations as another data preservation measure. In such configurations, the encoding module 228 may be termed as an encoding and encryption module.

In the exemplary embodiment, as described with reference to FIG. 2A, due to the one-way downlink 222, there is no physical uplink traffic from the TVWS network 204 to the SecDAS 206. Therefore, there is no uplink traffic from the TVWS network 204 to the second communications network 208. That is, data only flows in the downlink from the SecDAS 206 towards the one or more TVWS devices e.g. 212, 214, 216, 218. Therefore, in the exemplary embodiment, the likelihood of hackers, for example, stealing information from the secured TVWS network 204 may be eliminated.

In the exemplary embodiment, when the SecDAS 206 queries the GLDB 202 for spectrum information, the SecDAS 206 uses information (such as the geographical locations of the TVWS devices e.g. 212, 214, 216, 218). As there is no uplink traffic, a decoupled source 210 that is decoupled from the TVWS network 204 is provided for use with the SecDAS 206. In the exemplary embodiment, the decoupled source 210 that is decoupled from the TVWS network 204 is implemented with the user interface module 224. The user interface module 224 is configured for an administrator or user to input the information associated with the TVWS network 204, e.g. TVWS device information. It has been recognised that the information associated with the TVWS network 204 such as TVWS device information may not change frequently, especially for TVWS devices with fixed geographical locations. Therefore, given the relative non-variance, it is recognised by the inventors that it is workable for administrators to input the information e.g. via a GUI.

In the exemplary embodiment, the user interface module 224 obtains inputted information from the decoupled source 210, e.g. a user interface such as a GUI, and transmits the inputted information to the database query engine module 226. The decoupled source 210 (e.g. the GUI) may optionally be configured to, upon receiving spectrum information from the GLDB, display the received spectrum information to the user (e.g. via the GUI).

Therefore, with the usage of the decoupled source 210, the database query engine module 226 receives information from the user interface module 224 instead of receiving information directly from the TVWS devices e.g. 212, 214, 216, 218.

In the exemplary embodiment, the SecDAS 206 functions as a proxy device. That is, after information associated with the TVWS devices are inputted into the user interface module 224, the database query engine module 226 is configured to transmit the inputted information as a query to the GLDB 202 on behalf of the TVWS network 204 for spectrum information. The database query engine module 226 is also configured to receive query results from the GLDB 202. For example, the database query engine module 226 receives the spectrum information (e.g. a list of channels available for communications) together with other network parameters transmitted from the GLDB 202 and outputs the received spectrum information to other components of the SecDAS 206.

In the exemplary embodiment, the database query engine module 226 is configured to transmit the received spectrum information to one or more information-processing modules. For example, the received spectrum information is transmitted for one or more data preservation measures to be applied to the spectrum information. The received spectrum information may also be processed into non-executable information prior to application of the one or more data preservation measures.

An example of an information-processing module is the encoding module 228. The encoding module 228 is configured to apply encoding to received spectrum information as a data preservation measure. Encoding may be applied in the form of, but not limited to, parity check or using other advanced encoding schemes. The encoded information/data may then optionally, but not necessarily, undergo encryption as another data preservation measure. In the exemplary embodiment, encryption is additionally applied to ensure data integrity. The encoded and encrypted data is in the form of, but not limited to, plain text or other non-command format. As another example, the encoding module 228 may be further configured to process the received spectrum information into non-executable information prior to application of the one or more data preservation measures such as encoding of the received spectrum information.

In the exemplary embodiment, the encoded and encrypted data is then transmitted to the one-way hardware link module 230 of the SecDAS 206 for further transmission to the TVWS devices e.g. 212, 214, 216, 218. The one-way hardware link module 230 may be implemented in the form of, but not limited to, a one-way serial interface. In some exemplary embodiments, the serial interface is provided with a TX (transmit) line that is present/intact but with a RX (receive) line that is physically cut off. Alternatively, a one-way Ethernet cable may be used. For other exemplary embodiments, a one-way broadcast or other one-way links that are configured to only allow information to flow in one direction may be used using hardware implementations. The transmission of information/data from via the downlink 222 to the TVWS network 204 may be by wired or wireless connection.

The inventors have recognised that as the exemplary embodiment uses the one-way downlink 222, the SecDAS 206 does not receive acknowledgements from the TVWS devices e.g. 212, 214, 216, 218 that indicate that the devices e.g. 212, 214, 216, 218 have successfully received the transmitted data from the one-way hardware link module 230. Thus, additionally in the exemplary embodiment, the encoding module 228 may be optionally configured to schedule a periodic transmission as another data preservation measure and to periodically transmit the same data (i.e. even if there is no update to the content) in order to avoid possibilities of errors in transmission by the one-way hardware link module 230. In some exemplary embodiments, control information may be transmitted together with the data.

The inventors have also recognised that, utilising periodic transmission, a period of data transmission may be used as an additional piece of information for data integrity checks (as yet another data preservation measure). For example, by checking the timing periodicity of the data transmission, or by performing a parity check based on timing information, it may be determined if data integrity has been compromised.

In an exemplary scenario, the SecDAS 206 may be configured to transmit the same encoded (and optionally encrypted) data to the TVWS network 204 a predetermined number of times, e.g. 4 times, with a fixed time interval, e.g. 60 seconds, between each transmission. The set of transmissions may occur once SecDAS receives updates on the query results from GLDB 202. In the exemplary scenario, if the TVWS network 204 receives information not matching such a pattern (i.e. number of transmissions with predetermined time interval between transmissions) from the SecDAS 206, this may indicate that information flow from the SecDAS 206 has been modified or compromised.

In the above described exemplary embodiment, the decoupled source 210 is implemented using a user interface. However, it will be appreciated that the exemplary embodiments are not limited as such. The decoupled source 210 may be alternatively implemented using a read-only database that stores information associated with the first communications network e.g. the TVWS network 204.

As yet another alternative, the decoupled source 210 may be implemented using a second secured query proxy device that functions substantially similarly to the secured query proxy device 106 or the SecDAS 206. Such an implementation may be for a scenario whereby the spectrum utilising devices are relatively mobile as compared to the scenario described with reference to FIGS. 2A and 2B. Thus, the geographical locations of the spectrum utilising devices may change more frequently.

Figure 3:
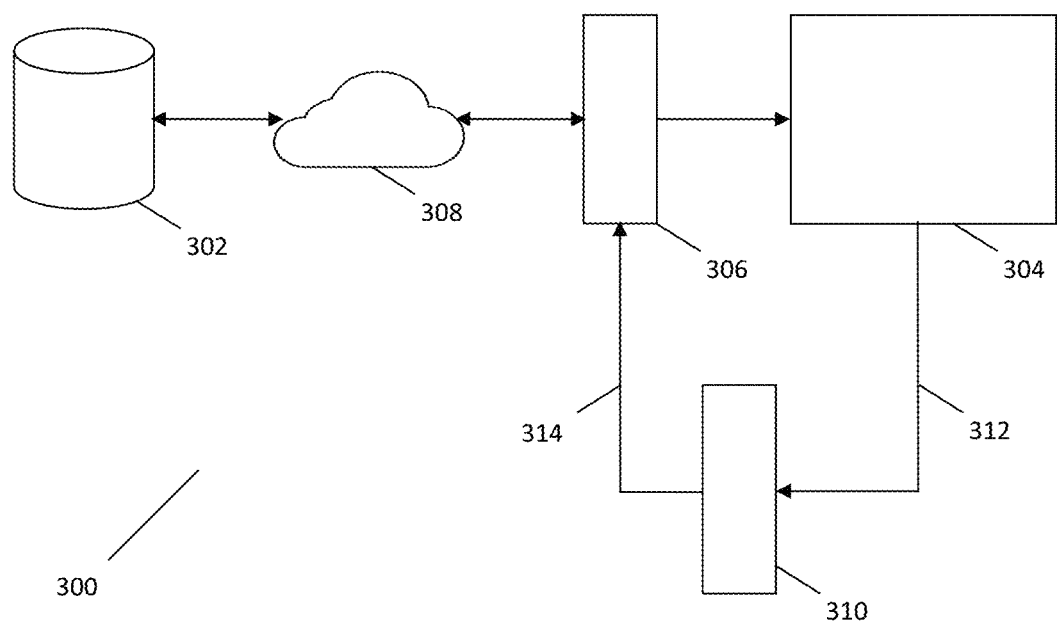
FIG. 3 is a schematic diagram illustrating spectrum information query system in another exemplary embodiment.

FIG. 3 is a schematic diagram illustrating a spectrum information query system 300 in another exemplary embodiment. The spectrum information query system 300 functions substantially similarly to the spectrum information query system 100 described with reference to FIG. 1 and the spectrum information query system 200 described with reference to FIG. 2A and FIG. 2B.

In the exemplary embodiment, the spectrum information query system 300 comprises a database 302 storing spectrum information (which functions substantially identically to the database 102 of FIG. 1) and a first secured query proxy device 306 (which functions substantially identically to the secured query proxy device 106 of FIG. 1). The spectrum information query system 300 further comprises one or more spectrum utilising devices forming a first communications network 304 which functions substantially similarly to the first communications network 104 described with reference to FIG. 1. In this exemplary embodiment, the one or more spectrum utilising devices may have varying geographical location information.

In the exemplary embodiment, the first secured query proxy device 306 is configured to communicate at its front-end with the database 302 via a second communications network 308, wherein the second communications network 308 functions substantially identically to the second communications network 108 described with reference to FIG. 1. In the exemplary embodiment, the first secured query proxy device 306 is configured to query the database 302 for spectrum information based on information associated with the one or more spectrum utilising devices forming the first communications network 304.

In the exemplary embodiment, the spectrum information query system 300 additionally comprises a second secured query proxy device 310. The second secured query proxy device 310 functions to provide a source that is decoupled from the first communications network 304. The second secured query proxy device 310 is configured to receive information associated with the first communications network. The second secured query proxy device 310 is coupled to the first secured query proxy device 306 to provide the information associated with the first communications network 304 in a decoupled manner such that the first secured query proxy device 306 obtains the information associated with the first communications network 304 indirectly (or not directly from the first communications network 304).

The second secured query proxy device 310 is configured to communicate at its front-end with the first communications network 304 in a uni-directional manner. In the exemplary embodiment, the second secured query proxy device 310 is configured to receive information associated with the first communications network 304 from a transmission from the first communications network 304. That is, the first communications network 304 is configured to transmit the information associated with the first communications network 304, or updates to the information associated with the first communications network 304, to the second secured query proxy device 310. In the exemplary embodiment, the information comprises geographical locations of the one or more spectrum utilising devices forming the first communications network 304. See numeral 312.

In the exemplary embodiment, the second secured query proxy device 310 is configured at its back-end to comprise or for a one-way downlink to the first secured query proxy device 306. Thus, the second secured query proxy device 310 may only transmit information to the first secured query proxy device 306. See numeral 314.

Therefore, the second secured query proxy device 310 functions as a proxy device to receive information associated with the first communications network 304, and to only transmit the obtained information associated with the first communications network 304 via the one-way downlink 314 to the first secured query proxy device 306. In the exemplary embodiment, the first secured query proxy device 306 thus receives the information associated with the first communications network 304 from a source that is decoupled, due to the one-way downlink of the second secured query proxy device 310, from the first communications network 304.

In the exemplary embodiment, the second secured query proxy device 310 periodically receives the information associated with the first communications network 304 e.g. from a push update from the first communications network 304. The second secured query proxy device 310 periodically transmits the received information to the first secured query proxy device 306.

In the exemplary embodiment, the second secured query proxy device 310 may be configured to apply one or more data preservation methods, such as encoding, to the information received from the first communications network 304, prior to the transmission of the received information to the first secured query proxy device 306. In such a scenario, the first secured query proxy device 306 may be configured to perform a reversal of the one or more data preservation methods to obtain the information associated with the first communications network 304. For example, decoding may be performed at a database query engine module (compare database query engine module 226 of FIG. 2B).

In the exemplary embodiment, the second secured query proxy device 310 comprises at least a one-way communication link. See numerals 312, 314. The exemplary embodiment may be modified to have other forms. That is, if the communication direction at numeral 312 is implemented as two-way, the communication direction at numeral 314 is implemented as one-way. Alternatively, if the communication direction at numeral 312 is implemented as one-way, the communication direction at numeral 314 may be implemented as two-way. It is recognised that the second secured proxy device 310 may be an identical device to the first secured proxy device described with reference to e.g. FIGS. 1 and 2A. For example, the second proxy device 310 may have a two-way communication link at its front-end (e.g. towards the first communications network 304) and a one-way communication link at its back-end (e.g. towards the first secured query proxy device 306).

Figure 7:
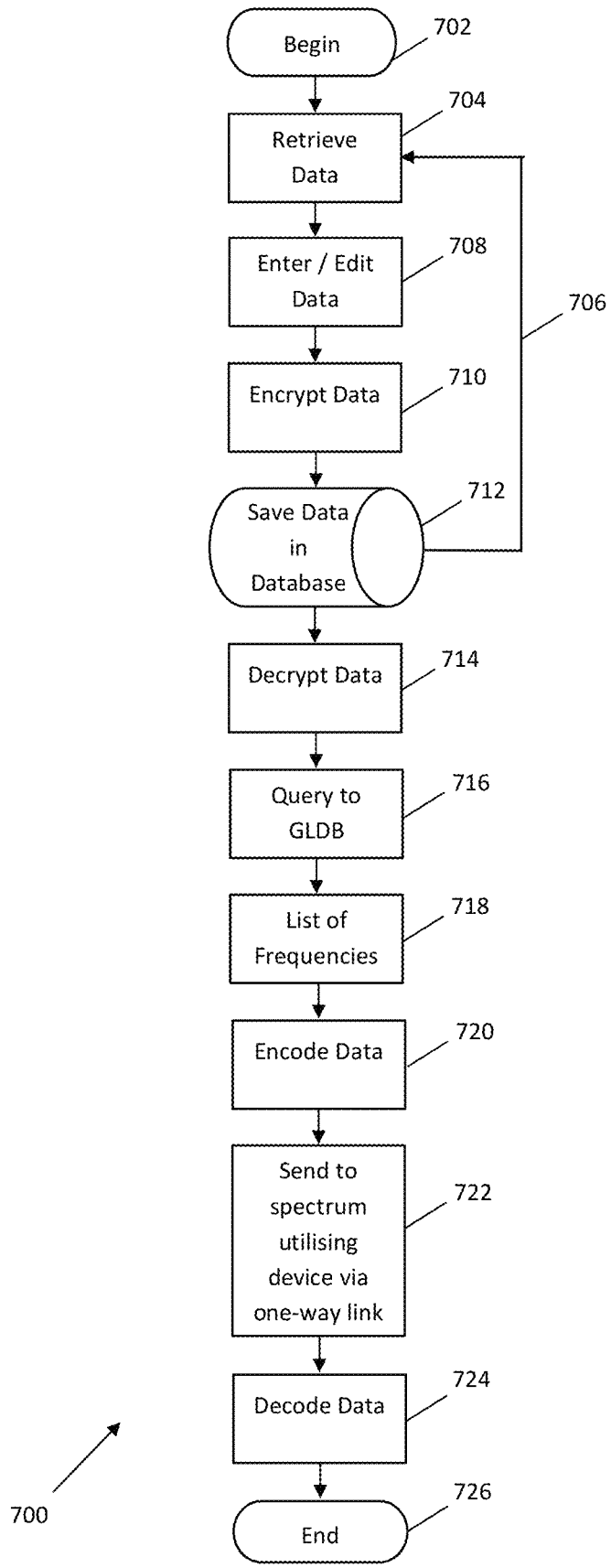
FIG. 7 is a schematic flowchart illustrating a query process flow of a spectrum information querying system in an exemplary embodiment.

FIG. 7 is a schematic flowchart 700 illustrating a query process flow in a spectrum information querying system in an exemplary embodiment. The spectrum information querying system is substantially similar to the spectrum information querying system 200 described with reference to FIGS. 2A and 2B.

At step 702, a spectrum information query is begun.

At step 704, data such as information associated with one or more TVWS devices forming a TVWS network (compare TVWS network 204 of FIG. 2A) is retrieved for a secured query proxy device. For example, the information associated with the TVWS network includes geographical information of the one or more TVWS devices forming the TVWS network. The data may be retrieved from a decoupled source (compare decoupled source 210 of FIG. 2A) or from a database within the secured query proxy device. For example, see numeral 706.

At step 708, a user may be allowed to enter new data and/or edit the data of step 704. The user may use a graphical user interface (GUI) via execution of an application. In the exemplary embodiment, the application is a web software application.

At step 710, the data is encrypted at the secured query proxy device (compare encryption module 227 of FIG. 2B).

At step 712, the encrypted data is stored in a database in the secured query proxy device. In exemplary embodiments, the database may be stored in a storage module within the secured query proxy device.

At step 714, prior to performing a query to a database storing spectrum information e.g. a GLDB, the secured query proxy device retrieves the encrypted data and performs decryption of the encrypted data.

At step 716, the secured query proxy device transmits a query to the GLDB (compare GLDB 202 of FIG. 2A) using the decrypted data.

At step 718, the GLDB transmits a query result comprising, but not limited to, a list of frequencies to the secured query proxy device.

At step 720, the secured query proxy device applies one or more data preservation measures to received data, i.e. the received spectrum information. In the exemplary embodiment, the one or more data preservation measures include encoding the received data.

At step 722, the secured query proxy device transmits the encoded data of step 720 to a spectrum utilising device, for example, a TVWS master device (compare TVWS Master Device 212 of FIG. 2A) via a one-way hardware downlink (compare one-way hardware link module 230 of FIG. 2B).

At step 724, the spectrum utilising device performs a reversal of the one or more data preservation measures. In the exemplary embodiment, the spectrum utilising device decodes the data of steps 720 and 722 from the secured query proxy device to recover the spectrum information of step 718 for further processing.

At step 726, the spectrum information query ends.

Figure 4:
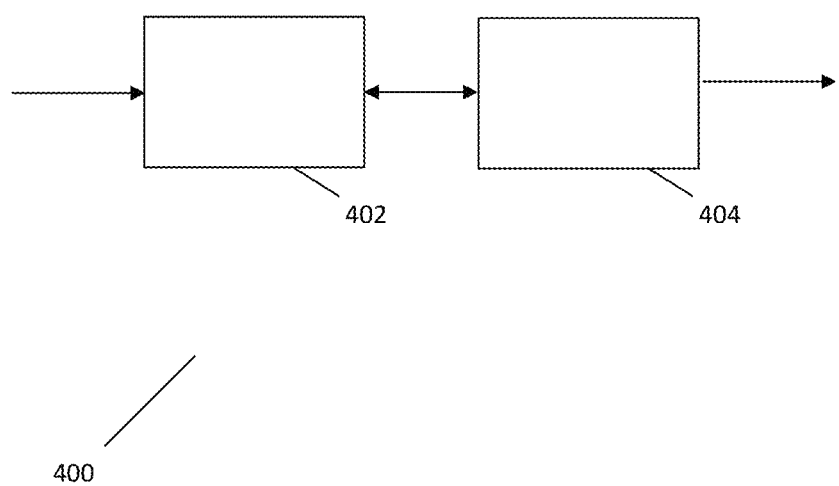
FIG. 4 is a schematic diagram illustrating components of a spectrum utilising device in an exemplary embodiment.

FIG. 4 is a schematic diagram illustrating components of a spectrum utilising device 400 in an exemplary embodiment.

In the exemplary embodiment, the spectrum utilising device 400 may be a master device or a slave device of a communications network, or may be a standalone device of a communications network. The spectrum utilising device 400 is capable of functioning or co-operating with a secured query proxy device 106, 206, 306 described with reference to FIGS. 1, 2A and 3 respectively.

In the exemplary embodiment, the spectrum utilising device 400 comprises a query proxy device interface module 402 and a spectrum manager module 404 coupled to the query proxy device interface module 402. The components of the spectrum utilising device 400 are coupled to a processing module (not shown) that is configured to control the functions of the various components.

In the exemplary embodiment, the query proxy device interface module 402 is configured to receive and interpret data transmitted by a secured query proxy device (compare 106 of FIG. 1, 206 of FIG. 2A, 306 of FIG. 3).

In the exemplary embodiment, the functionality of the query proxy device interface module 402 is to recover the spectrum information that has been processed by one or more information-processing modules of the secured query proxy device (e.g. compare the encoding module 228 of FIG. 2B). Thus, the query proxy device interface module 402 may function to reverse or to conduct opposite operations of the one or more information-processing modules of the secured query proxy device (e.g. compare the encoding module 228 of FIG. 2B).

In the exemplary embodiment, the query proxy device interface module 402 is configured to optionally decrypt the received data (if encryption has been performed at the secured query proxy device), to decode the data and to check that the parity is correct.

In the exemplary embodiment, the query proxy interface module 402 may be additionally configured to check the integrity of the data transmitted from the secured query proxy device to the spectrum utilising device 400. As the format of the data transmitted to the spectrum utilising device 400 is recognised to be substantially fixed, it is recognized that the data received at the spectrum utilising device 400 may be checked and ensured that the data format complies with a predetermined format before the spectrum information received at the spectrum utilising device 400 is further utilised.

In the exemplary embodiment, the query proxy device interface module 402 additionally checks the data received from multiple transmissions (i.e. one or more) in order to compare the decoded data from each transmission to ensure consistency. The decoded data (such as the list of available channels and other network parameters) is then transmitted to the spectrum manager module 404. It is recognised that the query proxy interface module 402 and the spectrum manager module 404 may communicate in a two-way direction. However, the exemplary embodiment is not limited as such. That is, the query proxy interface module 402 may be configured to communicate with the spectrum manager module 404 in a one-way direction.

The spectrum manager module 404 is configured to select suitable frequency channels for communications. In some exemplary embodiments whereby the spectrum utilising device 400 is functioning as a Master device of a communications network e.g. a TVWS Master device, the spectrum manager module 404 is also configured to transmit the selected frequency channels to one or more other spectrum utilising devices (e.g. to TVWS slave devices).

Figure 5:
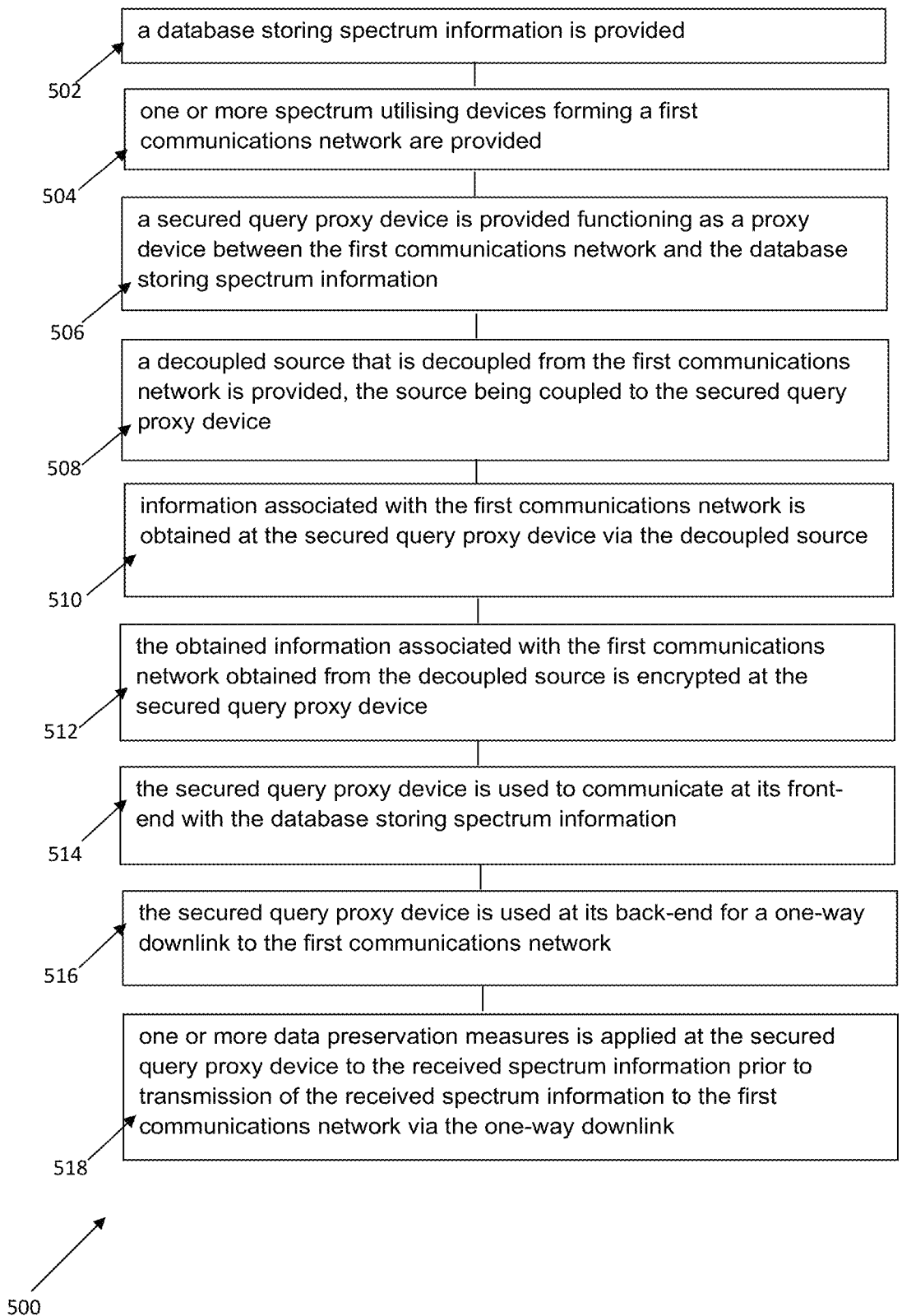
FIG. 5 is a schematic flowchart illustrating a method of querying a database storing spectrum information in an exemplary embodiment.

FIG. 5 is a schematic flowchart 500 illustrating a method of querying a database storing spectrum information in an exemplary embodiment. At step 502, a database storing spectrum information is provided. At step 504, one or more spectrum utilising devices forming a first communications network are provided. At step 506, a secured query proxy device is provided functioning as a proxy device between the first communications network and the database storing spectrum information. At step 508, a decoupled source that is decoupled from the first communications network is provided, the source being coupled to the secured query proxy device. At step 510, information associated with the first communications network is obtained at the secured query proxy device via the decoupled source. At step 512, the obtained information associated with the first communications network obtained from the decoupled source is encrypted at the secured query proxy device. At step 514, the secured query proxy device is used to communicate at its front-end with the database storing spectrum information. At step 516, the secured query proxy device is used at its back-end for a one-way downlink to the first communications network. At step 518, one or more data preservation measures is applied at the secured query proxy device to the received spectrum information prior to transmission of the received spectrum information to the first communications network via the one-way downlink.

In the exemplary embodiment, the one or more data preservation measures may comprise encoding, encryption, scheduling a periodic transmission of the received spectrum information via the one-way downlink etc. In the exemplary embodiment, another secured query proxy device functioning as another proxy device may be provided between the first communications network and the secured query proxy device, whereby the another secured query proxy device comprises at least one one-way communication link. In the exemplary embodiment, the method may additionally comprise a step of performing a reversal of the one or more data preservation measures to recover the received spectrum information at at least one of the one or more spectrum utilising devices. In the exemplary embodiment, the method may additionally comprise a step of processing at the secured query proxy device received spectrum information received from the database storing spectrum information into non-executable information prior to application of the one or more data preservation measures.

Figure 6:
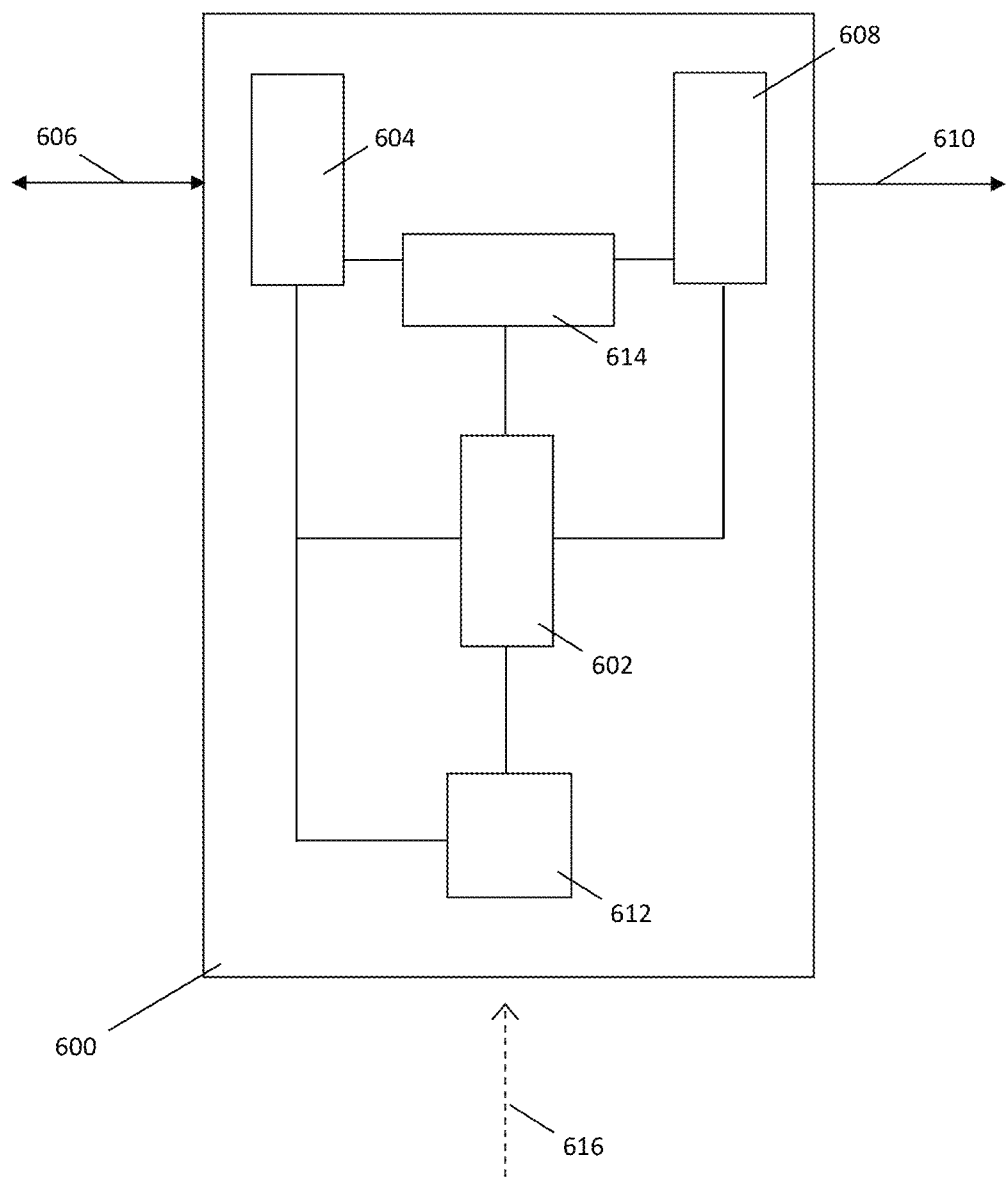
FIG. 6 is a schematic diagram illustrating a secured query proxy device in an exemplary embodiment.

FIG. 6 is a schematic diagram illustrating a secured query proxy device 600 in an exemplary embodiment. The secured query proxy device 600 comprises a processing module 602 for controlling the various functions and components of the device 600.

The processing module 602 is coupled to a front-end communications module 604, the front-end communications module 604 is configured for multi-directional communication. See numeral 606. The processing module 602 is coupled to a back-end communications module 608, the back-end communications module 608 is configured for a one-way communication. See numeral 610. In addition, the processing module 602 is coupled to an input module 612, the input module 612 is configured to couple to a decoupled source that is decoupled from a communications network (not shown). The processing module 602 is also coupled to one or more information-processing modules e.g. 614. The one or more information-processing modules e.g. 614 is configured to encrypt information obtained from the decoupled source. Further, in the exemplary embodiment, the one or more information-processing modules e.g. 614 is configured to apply one or more data preservation measures to the received information prior to transmission of the received information via the back-end communications module 608 for the one-way communication 610.

In the exemplary embodiment, the one or more information-processing modules e.g. 614 may be configured to process received information received at the front-end communications module 604 into non-executable information and/or plain-text information prior to application of the one more data preservation measures.

The decoupled source is schematically shown at numeral 616.

In the exemplary embodiment, the front-end communications module 604 and the back-end communications module 608 may be implemented as communications ports for the respective communications. It will be appreciated that the terms "front-end" and "back-end" are used to designate the multi-directional communications capability and the one-way uni-directional downlink limitation respectively, and should not be taken to be literally limited to a front side or back side of the secured query proxy device 600.

In the exemplary embodiment, the front-end communications module 604 is configured to query a database storing spectrum information (not shown) using information received at the input module 612. The information is associated with the communications network obtained from the decoupled source.

In the exemplary embodiment, the one or more information-processing modules e.g. 614 may comprise an encoder to apply encoding as one of the one or more data preservation measures. The one or more information-processing modules e.g. 614 may also comprise an encryption module to apply encryption as another one of the one or more data preservation measures. In the exemplary embodiment, the processing module 602 may be configured to instruct or to configure the back-end communications module 608 to schedule a periodic transmission of, and to periodically transmit, the received information as one of the one or more data preservation measures. In some exemplary embodiments, control information may be sent with the data.

In the exemplary embodiment, the input module 612 functions to facilitate the decoupled source that is decoupled from the communications network. For example, the input module 612 may be a user interface module to connect to a user interface that acts as the decoupled source. In some embodiments, the user interface module may provide the user interface integrated with the device 600. In some other embodiments, the input module 612 may be a communications port to facilitate and receive communications from another secured query proxy device (compare 310 of FIG. 3). In yet other exemplary embodiments, the input module 612 may alternatively be another database, such as a read-only database, that stores information associated with a first communications network (compare 104 of FIG. 1, 204 of FIG. 4 and 304 of FIG. 3). In such embodiments, the secured query proxy device is configured to access the another database to obtain information associated with the first communications network.

In various exemplary embodiments, encoding may be performed in the form of a parity check. In some exemplary embodiments, a single parity check is performed on binary transmission streams. In these embodiments, a parity bit (which may be an even parity bit or an odd parity bit) is computed and added to the end of every data unit before being transmitted, e.g. at a secured query proxy device.

In one exemplary embodiment, an even parity is used. In this embodiment, for a predetermined number of bits provided, the number of bits with a value of '1' is counted. If this number is an odd number, the parity bit value is set to T. As a result, the total number of occurrence of the value '1' would be an even number. If the number of bits with the value of '1' is an even number, the parity bit value is set to '0'.

In another exemplary embodiment, an odd parity is used. In this embodiment, for a predetermined number of bits provided, the number of bits with a value of '1' is counted. If this number is an even number, the parity bit value is set to T. As a result, the total number of occurrence of the value '1' would be an odd number. If the number of bits with the value '1' is an odd number, the parity bit value is set to '0'.

After a receiving end, e.g. at a spectrum utilizing device, receives the transmitted data (including the data unit and the parity bit), another parity bit is computed at a receiving end based on the received data. The generated parity bit is then compared with the parity bit sent by the transmitter. If the parity bits match, it is determined that the data unit does not contain an error. Conversely, if the parity bits do not match, it is determined that the data unit contain an error.

It is recognized that other forms of data integrity checks may be implemented apart from parity bits check. For example, hashing may be alternatively be used. As another example, Cyclic Redundancy Check (CRC) may also be alternatively used.

In various exemplary embodiments, parity check or CRC or the like may be performed as a form of error detection, such as transmission errors. It will be appreciated that any other form of parity check or CRC or error detection may be applied to the exemplary embodiments.

In various exemplary embodiments, encryption may be optionally implemented. In such embodiments, Advanced Encryption Standard (AES), Data Encryption Standard (DES) or any other forms of encryption may be applied.

In various exemplary embodiments, an information-processing module such as the encoding module 228 of FIG. 2B may be configured to generate text based on information/data received that may comprise control information and other information e.g. of a list of available channels/spectrums. In various exemplary embodiments, control information is used in transmission and reception of data before being received at the information-processing module. Such control information may comprise identifier(s) for the database storing spectrum information, the secured query proxy device, the communications network(s) formed by the one or more spectrum utilising devices, or the one or more spectrum utilising devices themselves. Control information may also broadly comprise data associated with ensuring data integrity. In some exemplary embodiments, such data includes, but is not limited to, data associated with encoding data in certain intervals, numbering of a sequence of data, fixing a format of data and fixing a sequence of sending the data. For example, the first line in a data may indicate the message format (e.g. number of lines) and the second line in the data may include a number of fields with further information (e.g. a first field indicates a device ID with 6 bytes, a second field indicates a first available frequency with 4 bytes, a third field indicates a second available frequency with 4 bytes, etc). One purpose of utilising such control information may be to identify whether data integrity has been compromised.

In various exemplary embodiments, the information-processing module is configured to erase/remove command or executable information from the received data. In exemplary embodiments, any suitable method to strip the control information from the received data may be utilised. Such stripping may comprise a raster-sweep of received information to determine if there exists code within the received information.

In various exemplary embodiments, the information-processing module is configured to thereafter convert the generated data into a final data in the form of plain text or other non-command format, such that the data/information is not able to effect programming changes or operations of the receiving devices e.g. of the network 104 of FIG. 1. Thus, the information processing may be useful for the prevention of attacks or hacking.

The described exemplary embodiments may provide a method and system to receive spectrum information such as GLDB data via e.g. a public network by utilizing a proxy device or a secured query proxy device that obtains information of a spectrum utilizing network. The spectrum utilizing network may be a DSA or TVWS network. It will be appreciated that the exemplary embodiments are not intended to be limited to TVWS.

In certain described exemplary embodiments, a secured query proxy device termed a Secured Database Access System (SecDAS) may pre-process the data received from a GLDB and determines a suitable one-way protocol for the data to be sent to a TVWS network for the network to select which frequencies to be the most suitable for communication. The protocol refers to interfaces and methods of interpreting data transmission between two modules/entities. Therefore, interfaces (e.g. serial interface, Ethernet interface etc.) are considered as part of the protocol. In some exemplary embodiments, encoding/decoding, periodic transmissions, encryption/decryption are also considered part of the protocol. In such described exemplary embodiments, the SecDAS is configured to strip off or remove or process any control information and only transmits information/data in plain text or other non-command, non-executable format containing e.g. the list of channels available and the associated parameters to the TVWS network.

In the described exemplary embodiments, by incorporating into a spectrum information query system a secured query proxy device that is configured for a one-way downlink (i.e. only permitting one-way traffic) to one or more spectrum utilising devices forming a communications network such as a TVWS network, potential avenues for hacking (such as backdoor hacking or theft of data) into the secured network (such as a TVWS network) may be eliminated. The secured query proxy device also implements additional information-processing or measures to ensure data integrity. Encoding checks using e.g. CRC checks, parity bit checks, comparison of data from periodic transmissions, and checks based on determining the format of data received etc., may be measures implemented. One or more such measures may prevent data tampering and can also allow data tampering to be detected at the one or more spectrum utilising devices. As a result, security of the spectrum information query system is enhanced.

In the described exemplary embodiments, spectrum utilizing devices e.g. of a wireless communications network may use a secured query proxy device to query a GLDB via a public or unsecured network but yet can be isolated from the public network in order to avoid hacking or other undesired behaviour/attacks. The secured query proxy device, e.g. termed as SecDAS, is disposed as a proxy device between a GLDB and the network of spectrum utilizing devices. Thus, the spectrum utilizing devices may query the GLDB via the SecDAS instead of directly. The SecDAS obtains or contains information regarding the wireless communications network. The SecDAS implements encryption of the information associated to the wireless communication network e.g. before storing the information in the SecDAS. This may prevent information from being obtained illegally or stolen e.g. by hacking. The SecDAS can perform e.g. encoding and encrypting of data received from the GLDB and sending of the encoded and encrypted data via a one-way hardware link e.g. in plain text or other non-command format. In the described exemplary embodiments, a reversal of the information processing (such as application of one or more data preservation measures) at the SecDAS can be performed at the wireless communications network. For example, decrypting and decoding the data may be performed at the wireless communications network in order to carry out wireless communication.

In the described exemplary embodiments, DSA or TVWS schemes may be provided for private networks or networks which may benefit from isolation from a public or unsecured network e.g. in order to avoid any potential backdoor attacks via e.g. a direct GLDB link.

The terms "coupled" or "connected" as used in this description are intended to cover both directly connected or connected through one or more intermediate means, unless otherwise stated.

In addition, the communications described in the present disclosure may be wireless communications, wired communications or both.

In exemplary embodiments, a secured query proxy device is described as a proxy between a first communications network and a database storing spectrum information. It is appreciated that the exemplary embodiments are not limited as such. That is, the secured query proxy device is capable of functioning as a proxy for a plurality of communications networks in communication with the database storing spectrum information. Further, the secured query proxy device may also query more than one databases storing spectrum information.

The description herein may be, in certain portions, explicitly or implicitly described as algorithms and/or functional operations that operate on data within a computer memory or an electronic circuit. These algorithmic descriptions and/or functional operations are usually used by those skilled in the information/data processing arts for efficient description. An algorithm is generally relating to a self-consistent sequence of steps leading to a desired result. The algorithmic steps can include physical manipulations of physical quantities, such as electrical, magnetic or optical signals capable of being stored, transmitted, transferred, combined, compared, and otherwise manipulated.

Further, unless specifically stated otherwise, and would ordinarily be apparent from the following, a person skilled in the art will appreciate that throughout the present specification, discussions utilizing terms such as "scanning", "calculating", "determining", "replacing", "generating", "initializing", "outputting", and the like, refer to action and processes of an instructing processor/computer system, or similar electronic circuit/device/component, that manipulates/processes and transforms data represented as physical quantities within the described system into other data similarly represented as physical quantities within the system or other information storage, transmission or display devices etc.

The description also discloses relevant device/apparatus for performing the steps of the described methods. Such apparatus may be specifically constructed for the purposes of the methods, or may comprise a general purpose computer/processor or other device selectively activated or reconfigured by a computer program stored in a storage member. The algorithms and displays described herein are not inherently related to any particular computer or other apparatus. It is understood that general purpose devices/machines may be used in accordance with the teachings herein. Alternatively, the construction of a specialized device/apparatus to perform the method steps may be desired.

In addition, it is submitted that the description also implicitly covers a computer program, in that it would be clear that the steps of the methods described herein may be put into effect by computer code. It will be appreciated that a large variety of programming languages and coding can be used to implement the teachings of the description herein. Moreover, the computer program if applicable is not limited to any particular control flow and can use different control flows without departing from the scope of the present disclosure.

Furthermore, one or more of the steps of the computer program if applicable may be performed in parallel and/or sequentially. Such a computer program if applicable may be stored on any computer readable medium. The computer readable medium may include storage devices such as magnetic or optical disks, memory chips, or other storage devices suitable for interfacing with a suitable reader/general purpose computer. In such instances, the computer readable storage medium is non-transitory. Such storage medium also covers all computer-readable media e.g. medium that stores data only for short periods of time and/or only in the presence of power, such as register memory, processor cache and Random Access Memory (RAM) and the like. The computer readable medium may even include a wired medium such as exemplified in the Internet system, or wireless medium such as exemplified in bluetooth technology. The computer program when loaded and executed on a suitable reader effectively results in an apparatus that can implement the steps of the described methods.

The exemplary embodiments may also be implemented as hardware modules. A module is a functional hardware unit designed for use with other components or modules. For example, a module may be implemented using digital or discrete electronic components, or it can form a portion of an entire electronic circuit such as an Application Specific Integrated Circuit (ASIC). A person skilled in the art will understand that the exemplary embodiments can also be implemented as a combination of hardware and software modules.

Additionally, when describing some embodiments, the disclosure may have disclosed a method and/or process as a particular sequence of steps. However, unless otherwise required, it will be appreciated the method or process should not be limited to the particular sequence of steps disclosed. Other sequences of steps may be possible. The particular order of the steps disclosed herein should not be construed as undue limitations. Unless otherwise required, a method and/or process disclosed herein should not be limited to the steps being carried out in the order written. The sequence of steps may be varied and still remain within the scope of the disclosure.

Further, in the description herein, the word "substantially" whenever used is understood to include, but not restricted to, "entirely" or "completely" and the like. In addition, terms such as "comprising", "comprise", and the like whenever used, are intended to be non-restricting descriptive language in that they broadly include elements/components recited after such terms, in addition to other components not explicitly recited. Further, terms such as "about", "approximately" and the like whenever used, typically means a reasonable variation, for example a variation of +/−5% of the disclosed value, or a variance of 4% of the disclosed value, or a variance of 3% of the disclosed value, a variance of 2% of the disclosed value or a variance of 1% of the disclosed value.

It will be appreciated by a person skilled in the art that other variations and/or modifications may be made to the specific embodiments without departing from the scope of the present disclosure as broadly described. The present embodiments are, therefore, to be considered in all respects to be illustrative and not restrictive.

The invention claimed is:

1. A spectrum information query system, the system comprising,
   a database storing spectrum information;
   one or more spectrum utilising devices forming a first communications network; and
   a secured query proxy device, the secured query proxy device configured to communicate at its front-end with the database storing spectrum information, wherein the secured query proxy device is configured at its back-end for a one-way downlink to the first communications network;
   a decoupled source that is decoupled from the first communications network, the source being coupled to the secured query proxy device, wherein the secured query proxy device is configured to obtain information associated with the first communications network via the decoupled source, the secured query proxy device being further configured to perform encryption of obtained information associated with the first communications network obtained from the decoupled source; and wherein the secured query proxy device is further configured to apply one or more data preservation measures to the received spectrum information prior to transmission of the received spectrum information to the first communications network via the one-way downlink.

2. The system as claimed in claim 1, further comprising the secured query proxy device being configured to query the database storing spectrum information using the information associated with the first communications network obtained from the decoupled source that is decoupled from the first communications network.

3. The system as claimed in claim 1, wherein the secured query proxy device is configured to encode the received spectrum information as one of the one or more data preservation measures.

4. The system as claimed in claim 1, wherein the secured query proxy device is configured to encrypt the received spectrum information as one of the one or more data preservation measures.

5. The system as claimed in claim 1, wherein the secured query proxy device is configured to schedule a periodic transmission of the received spectrum information to the first communications network via the one-way downlink as one of the one or more data preservation measures.

6. The system as claimed in claim 1, wherein the secured query proxy device comprises a user interface module to facilitate the decoupled source that is decoupled from the first communications network.

7. The system as claimed in claim 1, wherein the secured query proxy device is configured to access another database that functions as a decoupled source that is decoupled from the first communications network, the another database storing the information associated with the first communications network.

8. The system as claimed in claim 1, further comprising another secured query proxy device to function as the decoupled source that is decoupled from the first communications network and as a proxy between the secured query proxy device and the first communication network, the another secured query proxy device comprising at least one one-way communication link.

9. The system as claimed in claim 1, wherein at least one of the one or more spectrum utilising devices is configured to perform a reversal of the one or more data preservation measures to recover the received spectrum information.

10. The system as claimed in claim 1, wherein the database storing spectrum information comprises a Geo-Location Database (GLDB) and the information associated with the first communications network comprises geographical location information of the one or more spectrum utilising devices.

11. The system as claimed in claim 1, wherein the secured query proxy device is further configured to process received spectrum information received from the database storing spectrum information into non-executable information prior to application of the one or more data preservation measures.

12. A method of querying a database storing spectrum information, the method comprising,
   providing a database storing spectrum information;
   providing one or more spectrum utilising devices forming a first communications network; and
   providing a secured query proxy device functioning as a proxy device between the first communications network and the database storing spectrum information;

providing a decoupled source that is decoupled from the first communications network, the source being coupled to the secured query proxy device;

obtaining information associated with the first communications network at the secured query proxy device via the decoupled source;

encrypting at the secured query proxy device the obtained information associated with the first communications network obtained from the decoupled source;

using the secured query proxy device to communicate at its front-end with the database storing spectrum information;

using the secured query proxy device at its back-end for a one-way downlink to the first communications network; and applying one or more data preservation measures at the secured query proxy device to the received spectrum information prior to transmission of the received spectrum information to the first communications network via the one-way downlink.

13. The method as claimed in claim 12, further comprising querying the database storing spectrum information using the secured query proxy device that is in turn using the information associated with the first communications network obtained from the decoupled source that is decoupled from the first communications network.

14. The method as claimed in claim 12 or 13, further comprising encoding the received spectrum information as one of the one or more data preservation measures.

15. The method as claimed in claim 12, further comprising encrypting the received spectrum information as one of the one or more data preservation measures.

16. The method as claimed in claim 12, further comprising scheduling a periodic transmission of the received spectrum information by the secured query proxy device to the first communications network via the one-way downlink as one of the one or more data preservation measures.

17. The method as claimed in claim 12, further comprising providing a user interface module at the secured query proxy device to facilitate the decoupled source that is decoupled from the first communications network.

18. The method as claimed in claim 12, further comprising accessing another database that functions as a decoupled source that is decoupled from the first communications network, the another database storing the information associated with the first communications network.

19. The method as claimed in claim 12, further comprising providing another secured query proxy device functioning as the decoupled source that is decoupled from the first communications network and as another proxy device between the first communications network and the secured query proxy device;

the another secured query proxy device comprising at least one one-way communication link.

20. The method as claimed in claim 12, further comprising performing a reversal of the one or more data preservation measures to recover the received spectrum information at at least one of the one or more spectrum utilising devices.

21. The method as claimed in claim 12, wherein the database storing spectrum information comprises a Geo-Location Database (GLDB) and the information associated with the first communications network comprises geographical location information of the one or more spectrum utilising devices.

22. The method as claimed in claim 12, further comprising processing at the secured query proxy device received spectrum information received from the database storing spectrum information into non-executable information prior to application of the one or more data preservation measures.

23. A secured query proxy device, the device comprising,
a front-end communications module, the front-end communications module configured for multi-directional communications;
a back-end communications module, the back-end communications module configured for a one-way communication;
an input module, the input module configured to couple to a decoupled source that is decoupled from a communications network;
an encryption module, the encryption module configured to encrypt information associated with the communications network;
one or more information-processing modules, the one or more information-processing modules being configured to apply one or more data preservation measures to the received information prior to transmission of the received information via the back-end communications module for the one-way communication.

24. The device as claimed in claim 23, further comprising the front-end communications module being configured to query a database storing spectrum information using information associated with the communications network obtained from the decoupled source that is decoupled from the communications network.

25. The device as claimed in claim 23, further comprising the one or more information-processing modules being configured to encode the received information as one of the one or more data preservation measures.

26. The device as claimed in claim 23, further comprising the one or more information-processing modules being configured to encrypt the received information as one of the one or more data preservation measures.

27. The device as claimed in claim 23, wherein the back-end communications module is configured to schedule a periodic transmission of the received information as one of the one or more data preservation measures.

28. The device as claimed in claim 23, wherein the input module comprises a user interface module to facilitate the decoupled source that is decoupled from the communications network.

29. The device as claimed in claim 23, wherein the input module is configured to access another database that functions as a decoupled source that is decoupled from the communications network, the another database storing the information associated with the communications network.

30. The device as claimed in claim 23, wherein the one or more information-processing modules is further configured to process received spectrum information received from the database storing spectrum information into non-executable information prior to application of the one or more data preservation measures.

* * * * *